United States Patent [19]
Witte

[11] Patent Number: 5,399,026
[45] Date of Patent: Mar. 21, 1995

[54] BEARING WITH LUBRICATING RING FOR PROVIDING SUPPLEMENTAL LUBRICATION

[75] Inventor: Dwight C. Witte, Canton, Ohio
[73] Assignee: The Timken Company, Canton, Ohio
[21] Appl. No.: 994,632
[22] Filed: Dec. 21, 1992
[51] Int. Cl.⁶ ............................................. F16C 33/66
[52] U.S. Cl. ............................................... 384/463
[58] Field of Search ............. 384/470, 564, 462, 463, 384/569, 572, 571, 576, 902

[56] References Cited

U.S. PATENT DOCUMENTS

| | | | |
|---|---|---|---|
| 1,282,450 | 10/1918 | Miller | 384/470 |
| 2,029,445 | 2/1936 | Schubert | 384/606 |
| 2,734,787 | 2/1956 | Dorl | 384/571 |
| 2,747,951 | 5/1956 | Wallgren | 384/564 |
| 2,969,263 | 1/1961 | Lamson et al. | 384/463 |
| 3,582,164 | 6/1971 | Derner et al. | 384/578 |
| 3,628,835 | 12/1971 | Cornish et al. | 308/187 |
| 3,675,978 | 7/1972 | McKelvey | 384/463 |
| 3,782,795 | 1/1974 | Richey et al. | 384/463 |
| 3,989,326 | 11/1976 | Hormann et al. | 384/572 |
| 4,425,011 | 1/1984 | Cunningham | 308/214 |
| 4,534,871 | 8/1985 | Johnson | 252/12 |
| 4,601,592 | 7/1986 | Jatczak et al. | 384/564 |

FOREIGN PATENT DOCUMENTS 1396220  6/1975  United Kingdom .

Primary Examiner—Daniel P. Stodola
Attorney, Agent, or Firm—Polster, Lieder, Woodruff & Lucchesi

[57] ABSTRACT

A bearing, such as a tapered roller bearing, has races provided with opposed raceways and rollers which lie in a circular row between the races and have side faces along which they contact the raceways. In addition, the bearing has a rib provided with an abutment face located at the end of one of its raceways. The ends of the rollers contact this face, and here the bearing experiences its greatest friction. Even though the bearing loses its normal supply of lubrication, it still will not be damaged by the friction between the end faces of the rollers and the abutment face of the rib, since it contains a supplemental source of lubrication. To this end, the bearing includes a lubricating ring having a band which extends across the end faces of the rollers and tabs which project from the band into the spaces between the rollers so as to be presented opposite the abutment face on the thrust rib. The band carries a substance which holds a lubricant, and this substance contacts the end faces of the rollers to release its lubricant to the roller end faces should the bearing lose its normal supply of lubrication. Likewise, the tabs carry a substance which holds a lubricant, and this substance contacts the abutment face of the thrust rib, releasing its lubricant to the abutment face when the bearing loses its normal supply of lubrication. Thus, the critical surfaces of the bearing remain lubricated even when the normal supply of lubrication for the bearing is interrupted or fails.

18 Claims, 1 Drawing Sheet

BEARING WITH LUBRICATING RING FOR PROVIDING SUPPLEMENTAL LUBRICATION

BACKGROUND OF THE INVENTION

This invention relates in general to antifriction bearings and, more particularly, to a bearing having means for providing supplemental lubrication to critical surfaces within the bearing.

The tapered roller bearing in its most basic form includes an inner race or cone, an outer race or cup, and tapered rollers arranged in a single circular row between the cone and cup. The tapered rollers along their side faces contact tapered raceways on the cup and cone. This geometry enables the tapered roller bearing to take both radial and axial or thrust loads, making it ideally suited for many machine applications. But the geometry also causes each roller to experience a slight axially directed force when the roller transfers a radial load, and this force must be resisted if the bearing is to remain intact. Thus, to counteract the axial expulsion force, the cone of the typical tapered roller bearing has a thrust rib which projects radially beyond the large end of the cone raceway where it presents an abutment face against which the large end faces of the rollers bear.

When the cone rotates within the cup or the cup about the cone, the tapered rollers roll along the raceways. Essentially true rolling contact exists between the raceways and the tapered side faces of the rollers, and hence little friction develops along the raceways. But the large end faces of the rollers sweep or slide along the abutment face of the thrust rib, generating considerably more friction at this location. In many tapered roller bearings grease packed into the bearing on assembly reduces the friction sufficiently to avoid damage to the bearing. Others are furnished with a constant flow of liquid lubrication. In this regard, a tapered roller bearing inherently pumps its lubricants from the small ends of the raceways to the large ends of those raceways and thus will deliver the lubricant to the critical abutment face on the thrust rib.

Despite the measures to provide lubrication, tapered roller bearings occasionally operate with insufficient lubrication. Even though the condition may only be momentary, as it sometimes is, the sliding contact between the large end faces of the rollers and the abutment face of the thrust rib may be enough to cause significant damage.

To be sure, others have already addressed this problem. For example, some tapered roller bearings have hard coatings on the abutment surfaces of their thrust ribs and the large end faces of their rollers. Other bearings have porous metal thrust ribs which are impregnated with oil and release it to the large end faces of the rollers when the bearing loses its normal supply of lubrication. Still others have complex cages which carry lubricant and release it when necessary, not to the thrust rib and roller end faces, but to the roller side faces. Generally speaking, these attempts significantly increase the cost and complexity of the bearings.

The present invention resides in a roller bearing having lubricating means which releases a lubricant to the abutment face on a rib which guides the rollers of the bearing, with the release of the lubricant occuring when this critical surface area loses its normal supply of lubrication. The lubricating means may also release lubrication to the end faces of the rollers when they become starved for lubrication. The lubricating means may take the form of a ring having a band located opposite the end faces of the rollers and tabs projecting from the band and located opposite the abutment face of the rib.

DESCRIPTION OF THE DRAWINGS

In the accompanying drawings which form part of the specification and wherein like numerals and letters refer to like parts wherever they occur.

DETAILED DESCRIPTION

Figure 1:
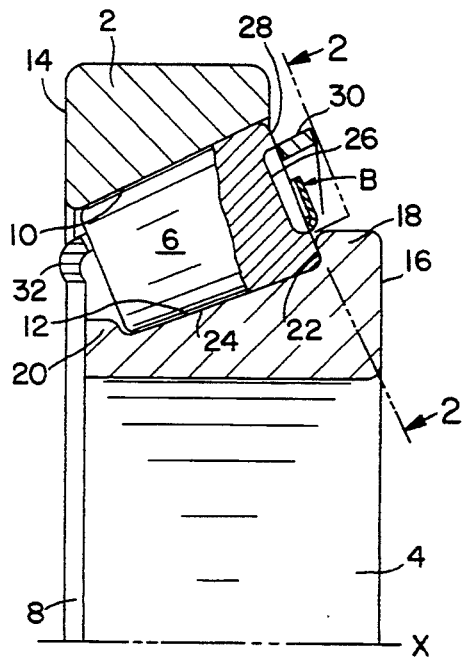
FIG. 1 is a sectional view of a tapered roller bearing having a lubricating ring constructed in accordance with and embodying the present invention.

Referring now to the drawings, A designates a tapered roller bearing which contains a lubricating ring B for supplying a lubricant to critical surfaces within the bearing A when the normal supply of lubrication for the bearing A fails or is interrupted. As a consequence the critical surfaces do not experience excessive friction—friction that might otherwise damage or destroy the bearing A. Perhaps the lubricating ring B has its greatest utility in a tapered roller bearing and hence the bearing A is depicted as such. But the ring A could also serve to protect any bearing having rollers which are guided or confined by at least one rib—bearings such as cylindrical roller bearings and spherical roller bearings.

The bearing A includes the typical components of a tapered roller bearing—namely an outer race or cup 2 and inner race or cone 4, tapered rollers 6 arranged in a circular row between the cup 2 and cone 4, and a cage 8 which likewise lies between the cup 2 and cone 4, indeed within the row of tapered rollers 6. The rollers 6 allow the cup 2 to rotate easily with respect to the cone 4 or vice-versa with minimum friction about an axis X of rotation which is of course the axis of the bearing A. To this end, the cup 2 has a tapered raceway 10 which is presented inwardly toward the axis X. The cone 4, on the other hand, has a tapered raceway 12 which is presented outwardly toward the raceway 10 of the cup 2. The two raceways 10 and 12, while being inclined at different angles, nonetheless are on apex, which means that if extended to their respective apexes, those apexes will lie essentially at a common point along the axis X of rotation. The cup 10 at the small end of its raceway 10 has a back face 14, whereas the cone 4 somewhat beyond the large end of its raceway 12 has a back face 16. The bearing A, being a tapered roller bearing, has the capacity to carry thrust or axial loads, and such loads are applied to the cup 2 and cone 4 at their respective back faces 14 and 16 which lie perpendicular to the axis X. In addition, the cone 4 has a thrust rib 18 which projects radially beyond the large end of the raceway 12, and a retaining rib 20 which projects beyond the small end of the raceway 12, both being integral parts of the cone 4. The cone back face 16 extends over one end of the thrust rib 18, whereas an abutment face 22 lies at the other end. Thus, the tapered cone raceway 12 leads up to the abutment face 22.

The tapered rollers 6 lie in a circular row between the cup 2 and the cone 4 and roll along the raceways 10 and 12 when the bearing A is in operation. Each has a tapered, or more accurately frustoconical, side face 24 along which it contacts the raceways 10 and 12, there being essentially line contact between the side face 24 of the roller 6 and the raceways 10 and 12, at least when the roller 6 passes through the so-called load zone, that is to say when it transmits a radial load between the cup 2 and cone 4. At its large end the roller 6 has a depression or recess 26 and a large annular end face 28 surrounding the recess 26. The end face 28 possesses a slightly spherical contour and contacts the abutment face 22 of the thrust rib 18.

Figure 3:
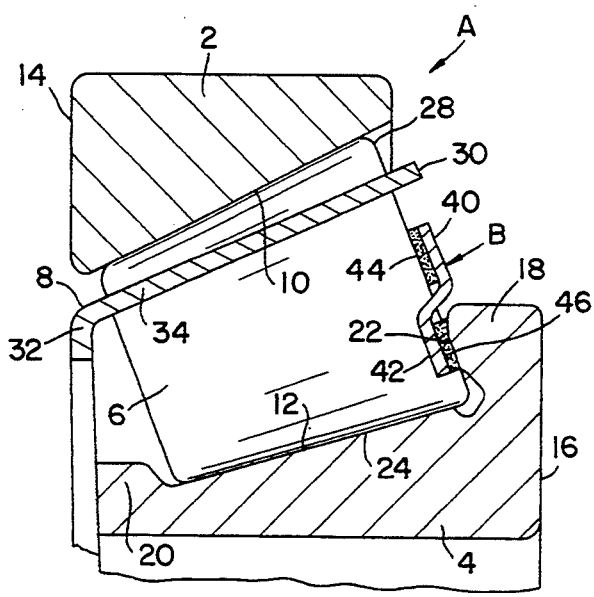
FIG. 3 is a sectional view of the bearing taken between its rollers along line 3—3 of FIG. 2.
Figure 2:
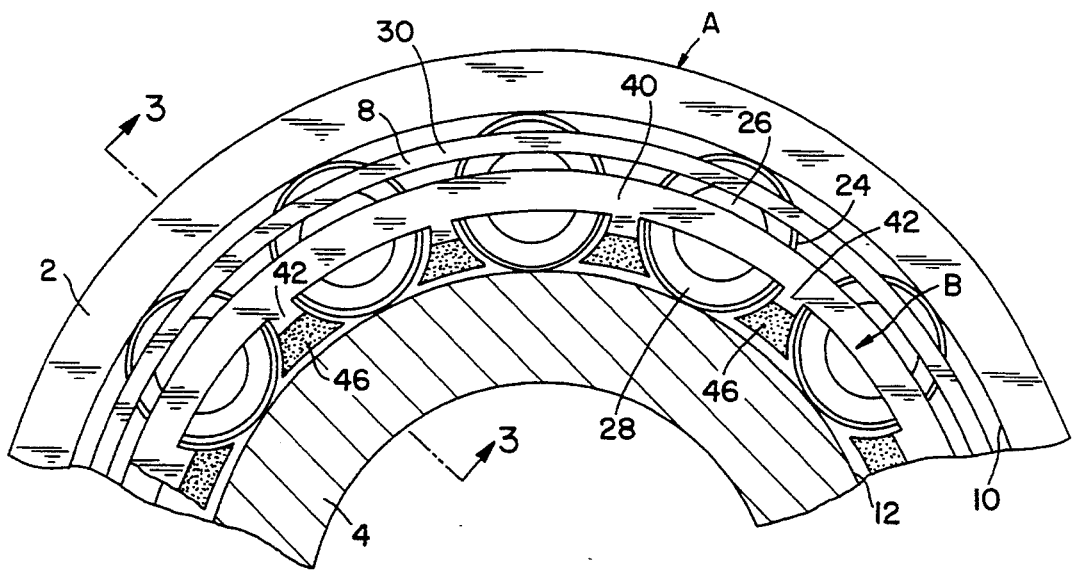
FIG. 2 is a fragmentary end view of the bearing taken partially in the section along line 2—2 of FIG. 1.

The cage 8 extends circumferentially through the annular space between the raceways 10 and 12 of the cup 2 and cone 4 where it maintains the proper spacing between the rollers 6. It further holds the rollers 6 around the cone 4 when the cone 4 is withdrawn from the cup 2. The cage 8 includes a large end band 30 which extends across the annular end faces 28 at the large end of the rollers 6 and a small end band 32 which extends across the small end faces of the rollers 6. Hence, the large end band 30 encircles the thrust rib 18 and the small end band 32 encircles the retaining rib 20. In addition, the cage 8 has bridges 34 (FIG. 3) which extend between the large and small end bands 30 and 32 slightly beyond the pitch circle described by the rollers 6 to maintain the proper separation between adjacent rollers 6.

In the absence of a load on any roller 6 the contact between the annular end face 28 of that roller 6 and the abutment face 22 of the cone thrust rib 18 is essentially point contact. Under load, however, the area of contact takes on a generally elliptical configuration—and the rollers 6 do experience axially directed force as they pass through the load zone where they transmit radial loads between the cup 2 and cone 4. In this regard, a radial load exerted on a roller 6 from each of the raceways 10 and 12 translates into a small axial component which urges the roller 6 up the tapers, that is toward the large ends of the raceways 10 and 12, and indeed the roller 6 would be expelled from the annular space between the two raceways 10 and 12 were it not for the thrust rib 18. The annular end face 28 of the roller 6 bears against the abutment face 22 on the thrust rib 18. This is good in the sense that it positions the roller 6 properly between the raceways 10 and 12, that is, it gives the roller 6 the proper axial position and angular orientation. It is not so desirable from the standpoint of the friction which develops.

Since the rollers 6 are essentially on-apex, only minimal friction develops between the roller side faces 24 and the raceways 10 and 12. Generally speaking, true rolling contact exists at those locations. But the annular end faces 28 of the rollers 6 slide or sweep along the abutment face 22 of the thrust rib 18, and here most of the friction within the bearing A develops. For this reason, the bearing A should have an ample supply of lubricant. Normally, the rollers 6 pump the lubricant up the tapers of the raceways 10 and 12 and onto the abutment face 22 of the thrust rib 18, this being an inherent characteristic of tapered roller bearings, and this lubricant is normally sufficient to prevent excessive friction from developing between the end faces 28 of the rollers 6 and the abutment face 22 of the thrust rib 18. The bearing A, however, may lose its normal supply of lubrication, or perhaps, that lubrication may be temporarily absent from the abutment face 22, and if that occurs, the bearing A may be damaged—unless a supplemental source of lubrication is readily available. The lubricating ring B provides that supplemental source of lubrication.

The lubricating ring B includes a band 40 and lubricating elements in the form of tabs 42 which project from the band 40. The band 40 circumferentially within the bearing A past the annular end faces 28 and recess 26 at the large ends of the rollers 6. It lies radially outwardly beyond the thrust rib 18, but within the large end band 30 of the cage 8. The axial dimension of the band 40 is quite small, but the radial dimension is large enough to enable the band 40 to present a substantial surface area toward the annular end faces 28 of the rollers 6 across which the band 40 extends. Along the inner margin of the band 40, the tabs 42 project from the band 40, there being a separate tab 42 at each space between adjacent rollers 6 in the circular row of rollers 6. Each tab 42 projects from the band 40 obliquely toward the cone raceway 12 and then turns generally perpendicular to the cone raceway 12, so that its major surface area lies opposite and parallel to the abutment face 22 of the cone thrust rib 18. The tab 42 is narrowest in its oblique region along the band 40 and from that location flares outwardly generally following the contours of the side faces 24 for the two rollers 6 between which it lies. The band 40 and tabs 42 may be formed from sheet metal with the tabs 42 formed integral with the band 40.

The band 40, on its surface which is presented toward the rollers 6, carries a layer 44 of a lubricating substance which actually contacts the annular end faces 28 of the rollers 6, although very lightly. The tabs 42, on the other hand, carry individual pads 46 which are presented toward the thrust rib 18 and are likewise formed from a lubricating substance. Indeed, the pads 46 contact the abutment face 22 of the thrust rib 18, although again lightly. Among the substances which are suitable for the lubricating layer 44 and the lubricating pads 46 are porous polymers, powdered metal compacted to less than theoretical density so as to have pores, other absorbent materials, such as flocking, and even some polymers which wear away and leave a lubricating film on the abutment face 22. Preferably, the substance from which the layer 44 and pads 46 is formed must have the capacity to absorb the lubricant with which the bearing normally operates, or at least some lubricant. The layer 44 and the pads 46 may be bonded to the band 40 and tabs 42. On the other hand, the band 40 and tabs 42 themselves may be formed from a suitable polymer or powdered metal, thus eliminating the need for the separate layer 44 and pads 46.

When the bearing A is placed in operation, the cone 4 rotates in relation to the cup 2 or vice versa, and the rollers 6 roll along the raceways 10 and 12. Moreover, the rollers 6 at the annular end faces 28 bear against the abutment face 22 on the thrust rib 18 of the cone 4. The lubricant for the bearing A circulates, it being pumped toward the thrust rib 18 by the rotating rollers 6. This usually provides enough lubrication to the abutment face 22 to prevent excessive friction from developing, even though the annular end faces 28 of the rollers 6 slide over the abutment face 22. In the presence of adequate conventional lubrication, the lubricating ring B serves no purpose, although its lubricating layer 44 and pads 46 lightly wipe the annular end faces 28 of the rollers 6 and the abutment face 22 of the thrust rib 18, respectively.

Should the normal supply of lubricant diminish or fail, the abutment face 22 and annular end faces 28 of the rollers 6 will not starve for lubrication, inasmuch as the porous or absorbent layer 44 on the band 40 will release its lubrication to the annular end faces 28 of the rollers 6 and the porous absorbent pads 46 will release the lubricant contained within them to the abutment face 22 of the thrust rib 18. This release of lubricant provides sufficient lubrication to the faces 22 and 28 to forestall damage to the bearing A.

Apart from that, the lubricating ring B renders the critical surfaces, that is the abutment face 22 and roller end surfaces 28, more resistant to scoring and scuffing. It also enables the bearing A, when lubricated simply with grease, to operate at speeds higher than conventional grease-lubricated bearings. Being simple in construction, the lubricating ring B is relatively inexpensive to manufacture, and it will fit a conventional tapered roller bearing without any modification to the bearing.

Both the cage 8 and the lubrication ring B revolve with the circular row of rollers 6 at the same velocity. The cage 8 and ring B may be united simply by joining the large end band 30 of the former to the band 40 of the latter. The lubricating ring B, while depicted in the tapered roller bearing A, which is designed for transmitting primarily radial loads, may also be used in tapered roller thrust bearings. It also has utility in other roller bearings having ribs for confining or guiding the rollers, such as cylindrical roller bearings and spherical roller bearings. Also, the thrust rib 18 may be at the end of the outer race or cup 2 as a separate rib ring, instead of at the end of the inner race or cone 4.

This invention is intended to cover all changes and modifications of the example of the invention herein chosen for purposes of the disclosure which do not constitute departures from the spirit and scope of the invention.

What is claimed is:

1. An antifriction bearing comprising: first and second races having opposed raceways, at least one of the races also having a rib located at an end of its raceway, with the rib having an abutment face adjacent to the end of the raceway; rollers arranged in a circular row between the races and having side faces which contact the raceways so that the rollers roll along the raceways when one race rotates relative to the other race, the rollers also having end faces which are positioned opposite the rib and contact the abutment face of the rib as the rollers roll along the raceways; and lubricating means presented opposite the abutment face of the rib for holding a lubricant and releasing it to the abutment face when the abutment face becomes starved for traditional lubrication, the lubricating means including a band which is located generally between the races and extends along those end faces of the rollers which contact the abutment face and tabs which project from the band into spaces between the rollers where the tabs contact the abutment face of the rib, the lubricating means holding the lubricant at the tabs so that the lubricant can be released to the abutment face of the rib.

2. A bearing according to claim 1 wherein the band contacts those ends of the rollers which contact the rib and the lubricating means holds the lubricant at the band so that the lubricant can be released to the ends of the rollers.

3. A bearing according to claim 2 wherein the band carries a layer formed from a porous material and the tabs carry pads formed from a porous material.

4. A bearing according to claim 2 wherein the raceways and the rollers are tapered; wherein the rollers at their side faces match the taper of the raceways; and wherein the rib is at the large end of one of the tapered raceways.

5. An antifriction bearing comprising: first and second races having opposed raceways; a rib located along one of the races and having an abutment face located adjacent to an end of the raceway on that race; rollers arranged in a circular row between the races and having side faces which contact the raceways so that the rollers roll along the raceways when one race rotates relative to the other race, the rollers also having end faces which are positioned opposite the rib and contact the abutment face of the rib as the rollers roll along the raceways; and a lubricating ring which rotates relative to the rib as the rollers roll along the raceways, the ring including lubricating elements that are separate and detached from the rollers and are presented opposite the abutment face of the rib where they wipe the abutment face as the ring rotates, the lubricating elements holding a lubricant and being capable of releasing that lubricant to the abutment face when the abutment face becomes starved for traditional lubrication.

6. An antifriction bearing according to claim 5 wherein the ring also includes a band to which the lubricating elements are attached, the band being presented opposite and wiping those ends of the rollers which bear against the abutment face of the rib and being capable of releasing a lubricant to those ends of the rollers should the ends of the rollers become starved for lubrication.

7. An antifriction bearing according to claim 5 wherein the raceways and rollers are tapered, with the rollers at their side faces matching the taper of the raceway, whereby the raceways have large and small ends, and the rib is located at the large end of one of the raceways.

8. A bearing according to claim 5 wherein the lubricating ring contacts the abutment face in spaces between the rollers.

9. A bearing according to claim 8 wherein the lubricating ring has a band that is located opposite those end faces of the rollers that contact the abutment face of the rib; and wherein the lubricating ring also holds a lubricant at the band and releases the lubricant that it holds to those end faces of the rollers that contact the abutment face of the rib should those end faces become starved for lubrication.

10. A bearing according to claim 9 wherein the lubricating ring contacts those end faces of the rollers which contact the abutment face of the rib.

11. In a tapered roller bearing that facilitates rotation about an axis and includes an outer race having a tapered raceway presented inwardly toward the axis of rotation, an inner race having a tapered raceway presented outwardly toward the raceway of the outer race, a rib having an abutment face located at the large end of one of the raceways, and tapered rollers arranged in a circular row between the races, with each roller having a tapered side face that contacts the tapered raceways of the races and a large end face which contacts the abutment face of the rib, the improvement residing in a lubricating ring for supplying lubrication to the abutment face of the rib when the rib loses its normal supply of lubrication, said lubricating ring comprising: a band which extends past the large end faces of the rollers, and tabs carried by the band and projecting toward one of the raceways and into spaces between the rollers such that the tabs are presented opposite the abutment face on the rib, the tabs carrying a substance which contacts the abutment face and holds a lubricant which the substance will release to the abutment face when the abutment face loses its normal supply of lubrication.

12. The combination according to claim 11 wherein the band carries a substance which contacts the large ends of the rollers and holds a lubricant which will be released to the large ends of the rollers when the large ends of the rollers lose their normal supply of lubrication.

13. The combination according to claim 12 wherein the rib is attached to and forms part of the inner race and the band of the lubricating ring generally encircles the rib.

14. The combination according to claim 12 wherein the substance which holds the lubrication comprises pads attached to the tabs and a layer attached to the band.

15. The combination according to claim 12 wherein the pads and layer are porous.

16. The combination according to claim 15 wherein band and tabs are formed from metal, with the tabs being formed integral with the band.

17. An antifriction bearing comprising: first and second races having opposed raceways; a rib located along one of the races and having an abutment face located adjacent to an end of the raceway on that race; rollers arranged in a circular row between the races and having side faces which contact the raceways so that the rollers roll along the raceways when one race rotates relative to the other race, the rollers also having first and second end faces with the first end faces being positioned opposite the rib and contacting the abutment face of the rib as the rollers roll along the raceways; a cage having end rings extending past the first and second end faces of the rollers and bridges extending between the end rings and along the rollers such that they maintain generally uniform spacing between the rollers; and a lubricating ring separate and detached from the cage and being rotatable relative to the rib as the rollers roll along the raceways, the lubricating ring including a band that is located between the rib and one of the end rings on the cage and extends past the first end faces of the rollers that bear against the abutment face, the band having a lubricating substance that is presented opposite the first end faces of the rollers such that the substance wipes the first end faces as the lubricating ring rotates, the lubricating substance holding a lubricant and being capable of releasing that lubricant to the first end faces of the rollers when the first end faces become starved for traditional lubrication, the lubricating ring also including tabs which project from the band into the spaces between the rollers and have a lubricating substance that is presented opposite and wipes the abutment face of the rib, the lubricating substance of the tabs holding a lubricant which it will release to the abutment face when the abutment face becomes starved for traditional lubrication.

18. An antifriction bearing according to claim 17 wherein the raceways and rollers are tapered so that the raceways have large and small ends, and the rib is located at the large end of one of the raceways.

* * * * *